(12) United States Patent
Bundy et al.

(10) Patent No.: US 8,764,067 B2
(45) Date of Patent: Jul. 1, 2014

(54) CONNECTION DEVICE

(75) Inventors: Gabriel Bundy, Timisoara (RO);
Thomas Pröttel, Esslingen (DE);
Andreas Schieszl, Ellwangen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/510,542

(22) PCT Filed: Jun. 29, 2010

(86) PCT No.: PCT/EP2010/059196
§ 371 (c)(1),
(2), (4) Date: Jul. 25, 2012

(87) PCT Pub. No.: WO2011/060967
PCT Pub. Date: May 26, 2011

(65) Prior Publication Data
US 2012/0280489 A1  Nov. 8, 2012

(30) Foreign Application Priority Data
Nov. 18, 2009 (DE) .......................... 10 2009 053 696

(51) Int. Cl.
*F16L 37/00* (2006.01)
*F16L 37/14* (2006.01)
*F16L 37/088* (2006.01)

(52) U.S. Cl.
CPC ............. *F16L 37/088* (2013.01); *F16L 37/148* (2013.01)
USPC .......................................... 285/305; 285/321

(58) Field of Classification Search
USPC ................................................ 285/321, 305
See application file for complete search history.

(56) References Cited

U.S. PATENT DOCUMENTS

| | | | | |
|---|---|---|---|---|
| 794,110 A * | 7/1905 | McDowell | .................... | 285/305 |
| 2,038,871 A * | 4/1936 | Mueller et al. | ................. | 285/321 |
| 3,181,897 A * | 5/1965 | Krayenbuhl et al. | ......... | 285/305 |
| 3,239,244 A * | 3/1966 | Leinfelt | ........................ | 285/305 |
| 3,334,929 A * | 8/1967 | Wiltse | ............................ | 285/305 |
| 3,560,026 A * | 2/1971 | Roe | ................................ | 285/321 |
| 3,606,402 A | 9/1971 | Medney | | |
| 3,922,011 A * | 11/1975 | Walters | ........................ | 285/321 |
| 4,146,252 A * | 3/1979 | Buda | ............................. | 285/305 |

(Continued)

FOREIGN PATENT DOCUMENTS

| DE | 41778 C | 5/1965 |
|---|---|---|
| EP | 1845299 A1 | 10/2007 |
| EP | 2131090 A2 | 12/2009 |

*Primary Examiner* — David E Bochna
(74) *Attorney, Agent, or Firm* — Rader, Fishamn & Grauer PLLC

(57) ABSTRACT

A connection device may include an insertion section having an annular outer groove. A housing may be configured to receive the insertion section. A blocking element may be configured to lock the insertion section in the housing, wherein the blocking element may engage the annular outer groove and an annular inner groove formed in the housing. The blocking element may also be configured to be withdrawn through a housing opening substantially tangentially to the grooves and to be pre-fitted in the inner groove and in a pre-fitted state. The blocking element may engage the outer groove and be fixed on the housing securing it against a displacement in a peripheral direction. A securing device may be arranged on an exterior of the housing for securing of the blocking element against displacement at least in the withdrawal direction.

18 Claims, 9 Drawing Sheets

(56) References Cited

U.S. PATENT DOCUMENTS

| | | | |
|---|---|---|---|
| 4,289,339 A * | 9/1981 | Hansen | 285/305 |
| 4,293,148 A * | 10/1981 | Milberger | 285/305 |
| 4,396,210 A | 8/1983 | Spencer, III et al. | |
| 4,427,221 A * | 1/1984 | Shay, Jr. | 285/305 |
| 4,498,874 A * | 2/1985 | Pichl | 285/305 |
| 4,697,947 A * | 10/1987 | Bauer et al. | 285/305 |
| 4,749,192 A * | 6/1988 | Howeth | 285/305 |
| 5,176,413 A * | 1/1993 | Westman | 285/321 |
| 6,179,347 B1 | 1/2001 | Dole et al. | |
| 6,343,813 B1 * | 2/2002 | Olson et al. | 285/305 |
| 6,386,596 B1 * | 5/2002 | Olson | 285/321 |
| 6,739,629 B2 * | 5/2004 | Riedy et al. | 285/305 |
| 6,921,114 B1 * | 7/2005 | Washburn et al. | 285/321 |
| 7,097,211 B2 * | 8/2006 | Adams | 285/321 |
| 2007/0246936 A1 | 10/2007 | Jeltsch | |

* cited by examiner

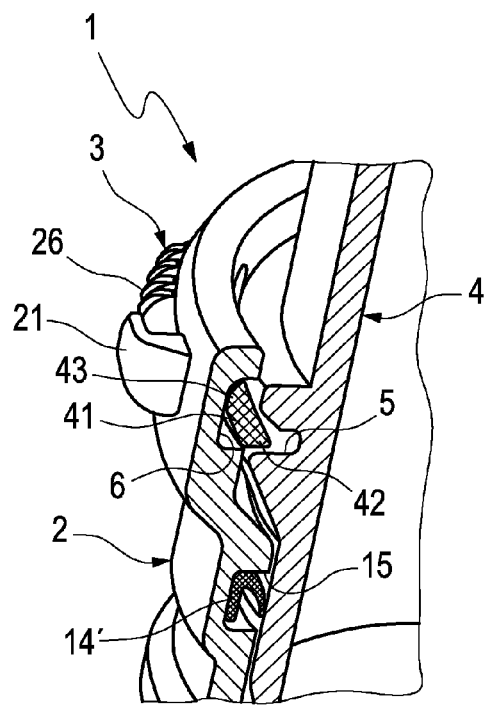
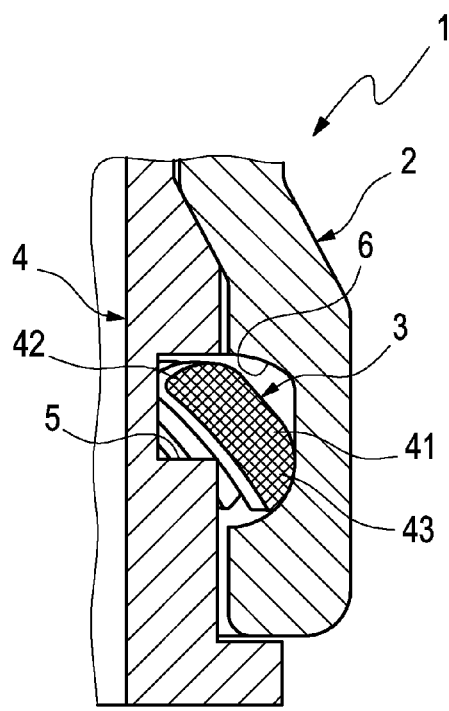
Fig. 5  Fig. 6
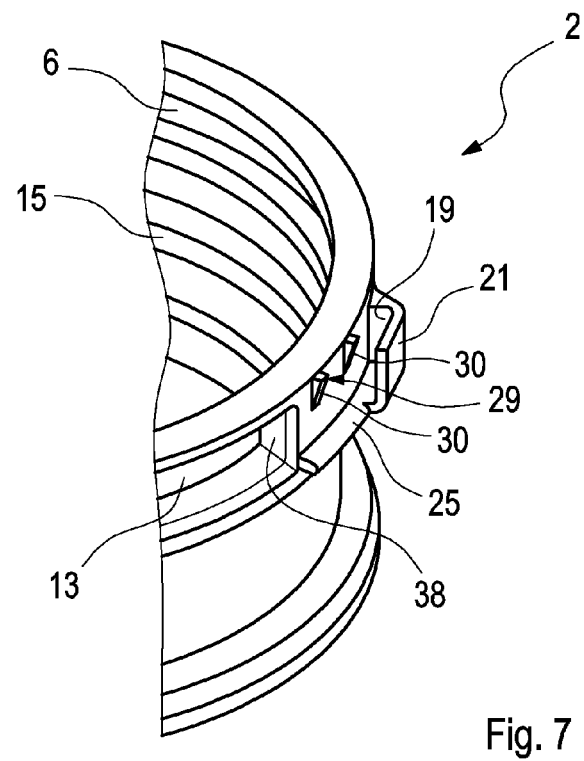
Fig. 7

CONNECTION DEVICE

CROSS-REFERENCE TO RELATED APPLICATIONS

This application claims priority to German Patent Application 10 2009 053 696.5 filed on Nov. 18, 2009 and PCT/EP2010/059196 filed on Jun. 29, 2010, which are hereby incorporated by reference in their entireties.

TECHNICAL FIELD

The present invention relates to a connection device for an insertion section of a tubular or pipe-shaped conduit or of a connection piece, said insertion section having an annular outer groove, having the features of the introductory clause of Claim 1.

BACKGROUND

A connection device of this type is known from EP 1 845 299 B1. It comprises a housing into which the insertion section is able to be inserted. The known connection device has, in addition, a blocking element by which the insertion section, inserted into the housing, is able to be locked in the housing. For locking the insertion section in the housing, the blocking element engages into the outer groove of the insertion section and into an annular inner groove formed in the housing. Through a housing opening, the blocking element is able to be withdrawn substantially tangentially to the grooves from the latter. In addition, the blocking element is able to be pre-fitted in the inner groove and in the pre-fitted state permits, with elastic deflection, the inserting of the insertion section into the housing, wherein then the blocking element engages into the outer groove. Furthermore, in the connection device, the blocking element is secured in the pre-fitted state on the housing against a displacement in the peripheral direction.

In the known connection device, the blocking element is situated in the pre-fitted state largely within the outer periphery of the housing. The securing of the blocking element against displacement takes place exclusively within the outer periphery of the housing, and namely in the region of the housing opening.

Further connection devices which comprise a housing, an insertion section and a blocking element are known for example from U.S. Pat. No. 6,179,347 B1 and from U.S. Pat. No. 3,606,402.

SUMMARY

The present invention is concerned with the problem of indicating an improved embodiment for a connection device of the type named in the introduction, which is distinguished in particular by a simplified handling and/or by an improved securing against displacement and/or by an increased load capacity or respectively reliability.

This problem is solved according to the invention by the subject matter of the independent claim. Advantageous embodiments are the subject matter of the dependent claims.

The invention is based on the general idea of realizing the securing of the blocking element against displacement at least in the withdrawal direction on the outside of the housing. For this, a securing device arranged on the outside of the housing is proposed. Through the arrangement of such a securing device on the outside of the housing, a simplified accessibility results, which improves the handling of the securing device and hence of the connection device. Furthermore, distinctly more installation space is available on the outside of the housing than in the region of the housing opening, so that a particularly reliably operating securing against displacement is able to be realized.

In accordance with an advantageous embodiment, the securing device can have an outer stop arranged on the outside of the housing, which lies opposite an end of the blocking element, lying on the exterior, in the pre-fitted state in the withdrawal direction. Such an outer stop brings about a particularly effective securing against displacement of the blocking element in the withdrawal direction.

According to another advantageous embodiment, the securing device can have a mounting pocket arranged on the outside of the housing, into which an end of the blocking element, lying on the exterior, is inserted in the pre-fitted state. Such a mounting pocket enables on the one hand an effective securing against a displacement of the blocking element in the withdrawal direction. On the other hand, such a mounting pocket also prevents an accidental actuation of the blocking element, in order to prevent an unwanted release.

In accordance with a particularly advantageous further development, this mounting pocket can be open on an axial side, such that the end of the blocking element lying on the exterior is able to be inserted through the open axial side into the mounting pocket and is able to be withdrawn therefrom. This embodiment causes the end of the blocking element lying on the exterior to have to be moved in two directions, lying perpendicularly to each other, in order to be able to release the connection which is produced by means of the connection device. An accidental or inadvertent opening of the connection can thereby be better avoided.

In accordance with another advantageous embodiment, which can also represent in independent solution to the present problem, the housing opening can be greater in the peripheral direction, in particular at least two times greater, than in the axial direction. In other words, the invention is based here on the general idea of dimensioning the housing opening so as to be comparatively large in the peripheral direction. This has the result that the blocking element, on insertion and on withdrawal, scarcely has to be deformed, so that it is only subjected comparatively little to bending stress. At the same time, the introduction and withdrawal of the blocking element is thereby simplified. In particular, the withdrawal is significantly improved, because comparatively great tractive forces are able to be introduced.

In accordance with another embodiment, the securing device can have a depression arranged on the outside of the housing, into which a projection engages, which protrudes inwards from an end of the blocking element lying on the exterior. Hereby, a form fit acting in the peripheral direction is produced between the housing and the blocking element, which positions the blocking element relative to the housing. Furthermore, the projection simplifies the manual withdrawal of the blocking element. Therefore, through this type of construction, the handling of the connection device can be improved.

According to a further embodiment, the housing can have externally at least one peripheral rib extending in peripheral direction. Such a peripheral rib leads to a significant reinforcement of the housing in the region of the respective peripheral rib. Preferably, such a peripheral rib can be arranged on an end of the housing having the insertion opening for inserting the insertion section. Therefore, the housing is stabilized at its free end. An embodiment is advantageous in which at least two such peripheral ribs are provided, which are spaced apart from each other axially. In particular, the two peripheral ribs can be positioned on the housing so that the inner groove is arranged axially between the two peripheral ribs. In this way it is achieved that the housing is reinforced in a targeted manner in the region of the inner groove. Optionally, provision can be made to provide the housing externally with several longitudinal ribs extending in longitudinal direction, which in particular respectively connect two peripheral ribs with each other. Hereby also a reinforcement of the housing can be realized.

Further important features and advantages of the invention will emerge from the subclaims, from the drawings and from the associated description of figures with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
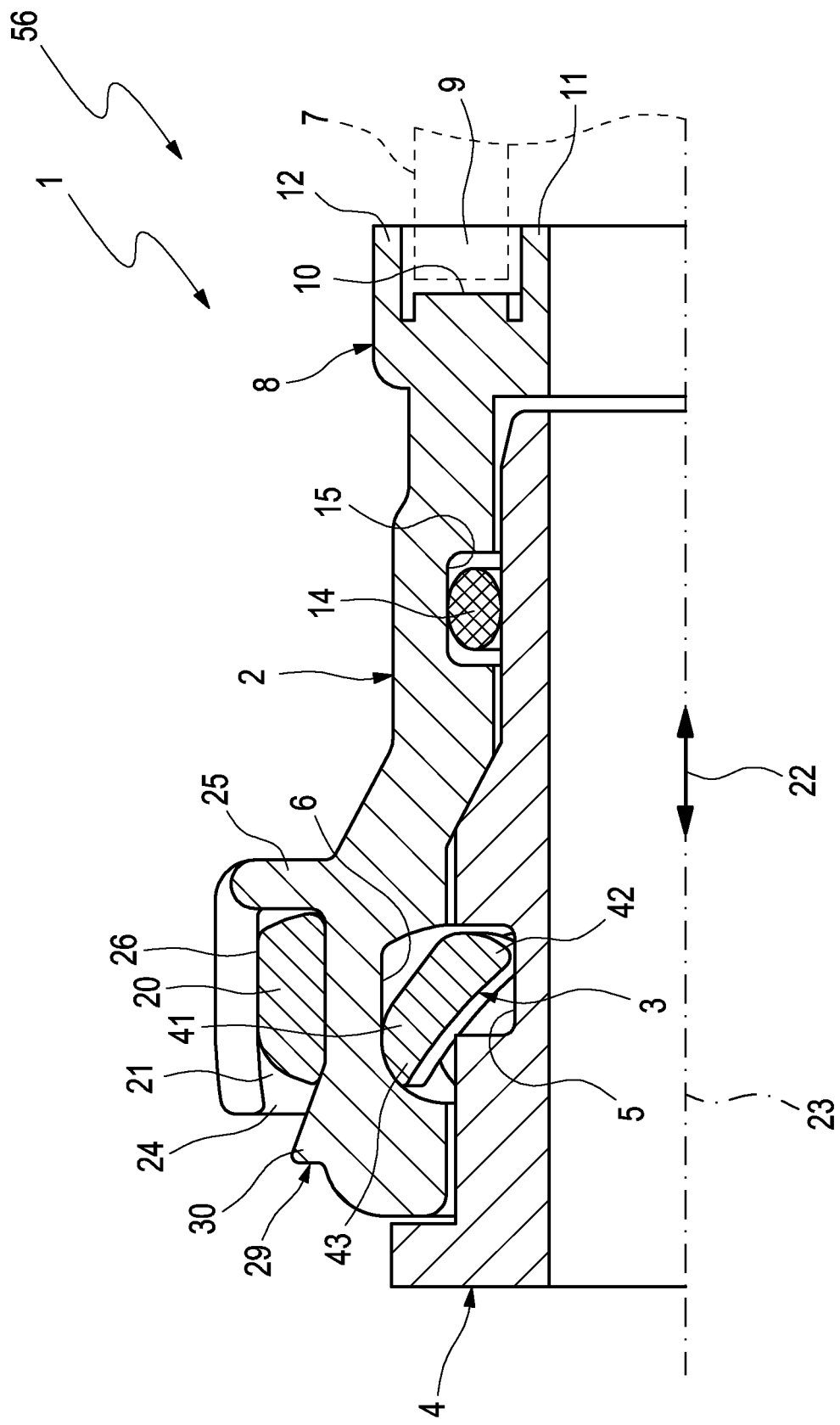
FIG. 1 a half longitudinal section of a connection device.

In accordance with FIGS. 1 to 17 and in particular with reference to FIG. 1, a connection device 1 comprises a housing 2 and a blocking element 3. The connection device 1 is provided for producing a connection for an insertion section 4. In the embodiments shown here, the insertion section 4 is configured as a connection piece. It is likewise possible to configure the insertion section 4 as a tubular or pipe-shaped conduit or as an end section of a tube or of a pipe. This insertion section 4 has an annular outer groove 5 on its outer side.

The connection device 1 preferably comes into use in motor vehicles, e.g. in a fresh air system of the vehicle for the supply of an internal combustion engine of the vehicle with fresh air. In particular, the invention therefore also relates to a fresh air system for the fresh air supply of an internal combustion engine, in particular of a motor vehicle, which is equipped with such a connection device 1.

In a special embodiment, the insertion section 4, in particular in the form of a connection piece, can be arranged, e.g. screwed, welded or clipped, on a suction module, in particular a fresh air system, or on a filter housing, in particular for air filtration, e.g. in a fresh air system. An embodiment can be particularly advantageous in which the insertion section 4, e.g. in the form of a connection piece, is formed integrally, e.g. by means of plastic injection moulding, on the suction module or on the filter housing.

The housing 2 is configured so that the insertion section 4 is able to be inserted into the housing 2. In addition, the housing 2 has an annular inner groove 6 on its inner side. The housing 2 is configured in a sleeve shape. It can be designed as a connecting piece. Likewise, it can be designed as an end piece for a tubular or pipe-shaped conduit 7, indicated by a broken line in FIG. 1.

The said conduit 7 can be designed for example as a blow-moulded part, which can be connected on the front face with the housing 2. A welded connection, in particular a friction welded connection, is suitable for example as a connection. In the example of FIG. 1, the housing is provided at its end remote from the blocking element 3 with a connection region 8, which is suitable in a particular manner for the production of a friction welded connection. In particular, this connection region 8 comprises an axial annular groove 9, which has at the base of the groove a projection 10 protruding into the groove 9, which is spaced apart both with respect to an inner wall 11 and also with respect to an outer wall 12 of the groove 9. With friction welding, this projection 10 fuses at least partially, whereby the gaps between the projection 10 and the walls 11, 12 are at least partially filled.

The blocking element 3 serves for arresting on the housing 2 the insertion section 4 which has been inserted into the housing 2. For this, the blocking element 3 engages on the one hand into the outer groove 5 of the insertion section 4 and on the other hand into the inner groove 6 of the housing 2. Furthermore, the housing 2 has a housing opening 13 which can be seen at least in FIGS. 2, 3 and 7, which penetrates the housing 2 radially. The blocking element 3 can be withdrawn through this housing opening 13 out from the inner groove 6 and the outer groove 5. By withdrawing the blocking element 3 from the connection device 1, the engaging between the insertion section 4 and the housing 2, which is brought about by means of the blocking element 3, can be eliminated, whereby the connection is disengaged and the insertion section 4 can be withdrawn from the housing 2.

The blocking element 3 is, in addition, able to be pre-fitted in the inner groove 6. This means that the blocking element 3 can be mounted in the inner groove 6 so that it also remains in the inner groove 6 or respectively on the housing 2 in the case of an absent insertion section 4. In this pre-fitted state, the blocking element 3 permits the insertion of the insertion section 4 into the housing 2. Herewith an elastic deformation or respectively deflection of the blocking element 3 is brought about and also an engaging with the outer groove 5, when the insertion section 4 reaches a designated insertion depth.

In FIG. 1 in addition a seal 14 is illustrated, which can be configured for example as an O-ring. In the example of FIG. 1, the seal 14 is inserted into a further annular inner groove 15, formed on the inner side of the housing 2, which is arranged at a distance from the inner groove 6 associated with the blocking element 3, and is positioned between the said inner groove 6 and the connection section 8.

Figure 2:
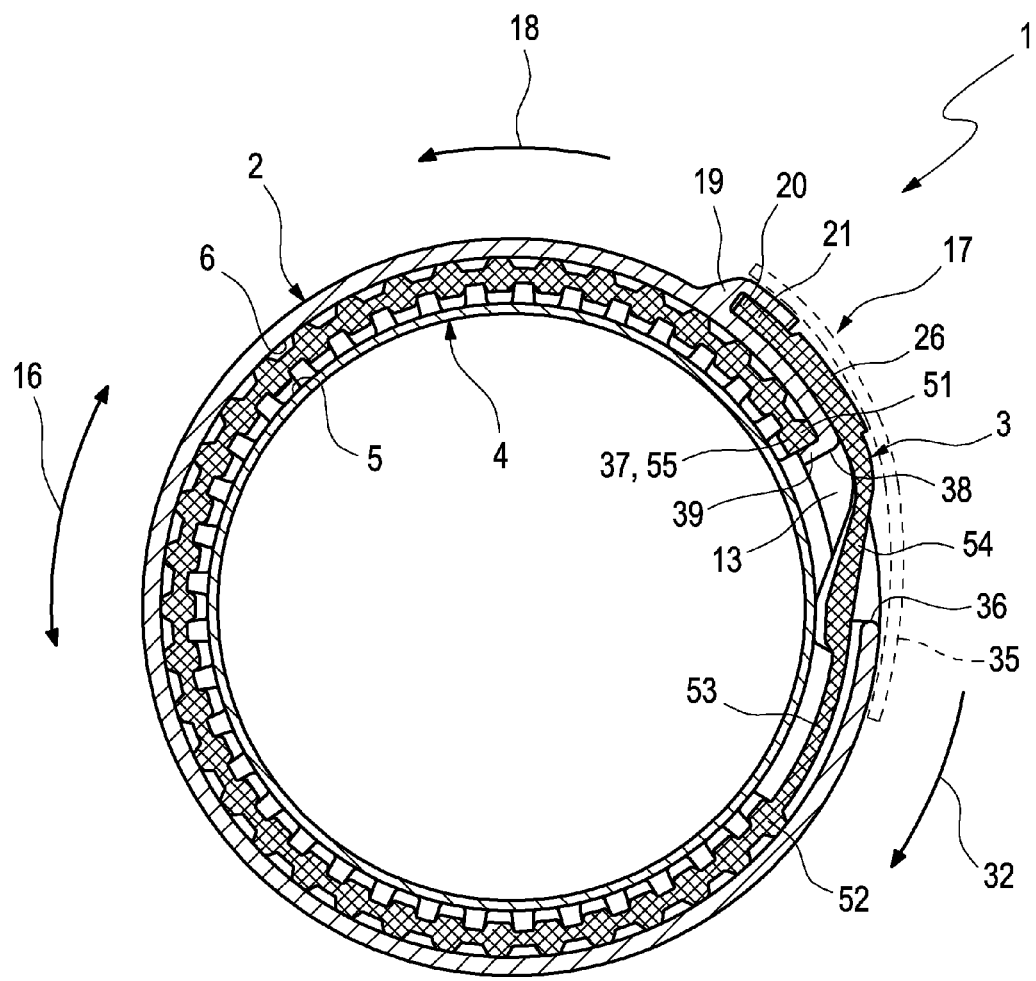
FIG. 2 a cross-section of the connection device in the region of a blocking element, FIG. 3 a perspective view of a housing of the connection device, FIG. 4 a perspective view of the blocking element, FIG. 5 a partial perspective detail view of the connection device in longitudinal section in the region of the blocking element, FIG. 6 a view as in FIG. 5, but in a different embodiment, FIG. 7 a partial view as in FIG. 3, in the region of a securing device, FIG. 8 a side view of the connection device in the region of the securing device, FIG. 9 a view as in FIG. 8, but in a different embodiment, FIG. 10 an enlarged detail view of the blocking element, FIG. 11 a longitudinal section of the blocking element, FIG. 12 a cross-section of the connection device in the region of a securing device, FIG. 13 a perspective view of a housing of the connection device, FIGS. 14 to 17 longitudinal sections of the connection device in the region of a blocking element, in different embodiments.
Figure 3:
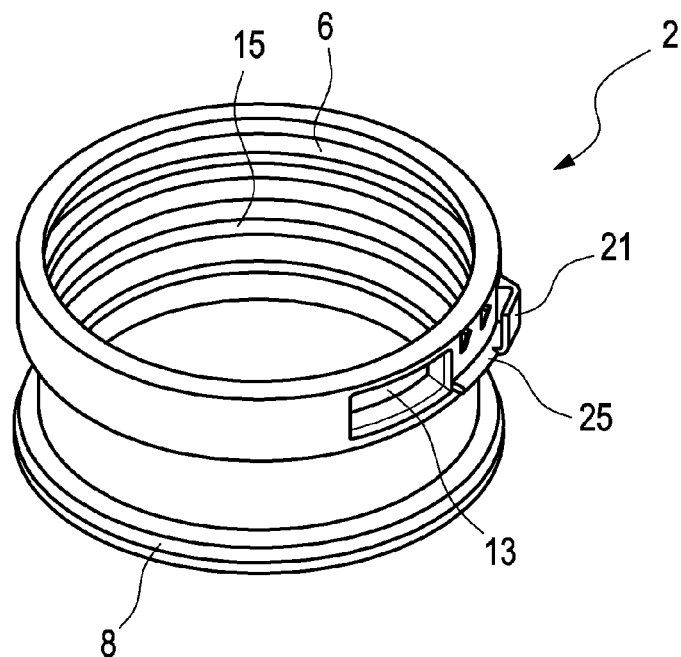

In the pre-fitted state, the blocking element 3 is secured on the housing 2 against a displacement in the peripheral direction, which is indicated in FIG. 2 by a double arrow and is designated by 16. This security against displacement of the blocking element 3 can be realized by means of a securing device 17. This securing device 17 is arranged here on the outside of the housing 2. It secures the blocking element 3 against a displacement relative to the housing 2 in the peripheral direction 16 at least in the withdrawal direction 18 indicated in FIG. 2 by an arrow.

The securing device 17 expediently comprises an outer stop 19, which is arranged on the outside of the housing 2. In the pre-fitted state, this outer stop 19 lies opposite an end 20 of the blocking element 3, lying on the exterior, in the withdrawal direction 18. The embodiment shown here is particularly expedient, in which the securing device 17 is additionally equipped with a mounting pocket 21, which is likewise arranged on the outside of the housing 2. In the pre-fitted state, the end 20 of the blocking element 3, lying on the exterior, is inserted into this mounting pocket 21. Expediently, the above-mentioned outer stop 19 can be constructed in this mounting pocket 21. Accordingly, the end 20, lying on the exterior, lies in the pre-fitted state inside the mounting pocket 21 opposite the outer stop 19 in the peripheral direction 16.

In accordance with FIGS. 3, 5 and 7 to 9, the mounting pocket 21 is open on an axial side, in accordance with preferred embodiments. The axial direction of the connection device 1 is indicated for example in FIG. 1 by a double arrow and is designated by 22. It lies here on a longitudinal central axis 23 of the housing 2 or respectively of the device 1. Through the axially open side of the mounting pocket 21, an axial opening 24 or open axial side 24 is formed, which can be seen in FIG. 1 and which faces away, for example, from the connection section 8. The end 20 of the blocking element 3, lying on the exterior, can be inserted through this opening 24, i.e. through the open axial side 24 into the mounting pocket 21, or respectively can the withdrawn therefrom. The adjustment movement of the end 20, lying on the exterior, of the blocking element 3 for securing in the mounting pocket 21 or respectively for releasing takes place axially here, i.e. transversely to the peripheral direction 16 and hence transversely to the withdrawal direction 18. Hereby, a particularly effective securing of the blocking element 3 is realized in the pre-fitted state.

In the embodiments shown here, the mounting pocket 21 is configured so as to be closed opposite the open axial side 24, i.e. opposite the opening 24. In addition, the mounting pocket 21 is lengthened in the peripheral direction, and namely in the direction towards the housing opening 15 by means of a support web 25. In accordance with FIGS. 1, 8 and 9, in the pre-fitted state an end section 26 of the blocking element 3, lying on the exterior, which has the end 20 lying on the exterior, can come to lie axially against this support web 25. Hereby, an axial securing in position is produced for the pre-fitted state for the end section 26 lying on the exterior.

Figure 8:
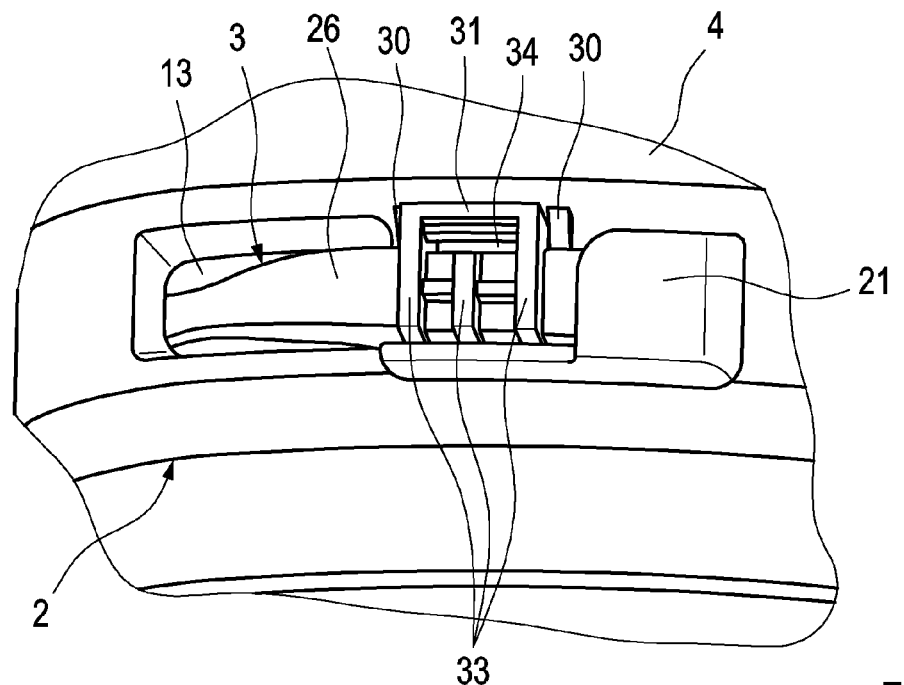
Figure 9:
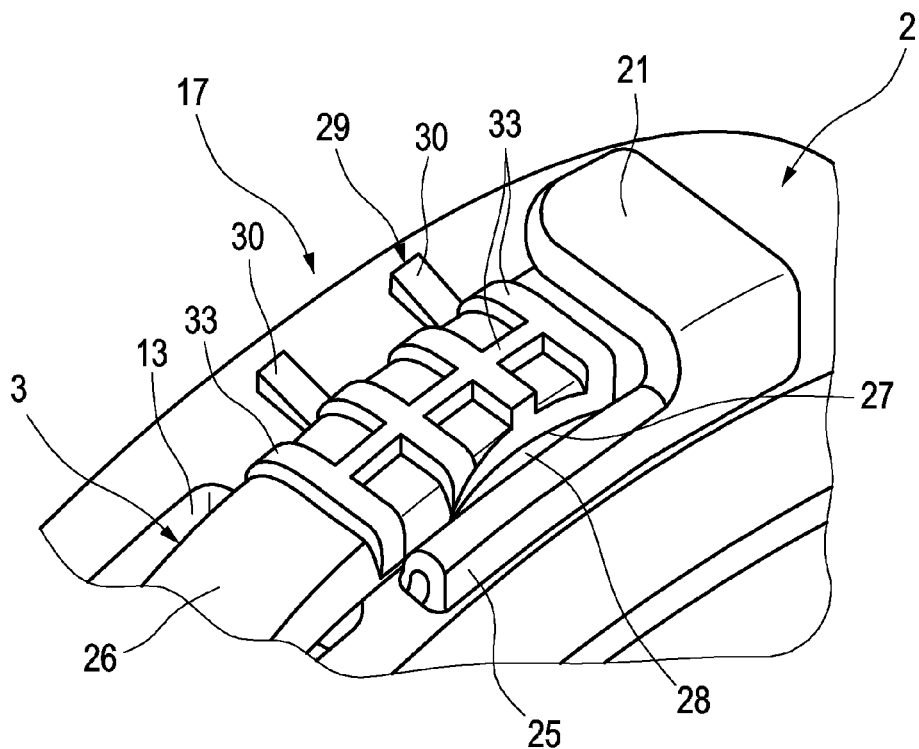

According to FIG. 8, the end section 26 lying on the exterior can come to lie substantially in a laminar manner against the support web 25. Alternatively to this, FIG. 9 shows an embodiment in which the blocking element 3 has on its end section 26, lying on the exterior, an axially oriented indentation 27, which is positioned so that in the pre-fitted state a slot 28 is formed between the end section 26 and the support web 25, which slot is dimensioned so that it can be used as a tool access. For example, a flat screwdriver can be inserted into the slot 28, in order to move the end section 26 out from the mounting pocket 21 laterally, i.e. axially, by levering or twisting.

The securing device 17 can be equipped with a detent device 29 additionally or alternatively to the features described above. This detent device 29 comprises at least one detent 30. In the embodiments shown here, respectively two such detents 30 are provided. The respective detent 30 interacts in the pre-fitted state with the end section 26, lying on the exterior, of the blocking element 3. In so doing, the respective detent 30 impedes an axial adjustment of this end section 26, lying on the exterior, relative to the housing 2. In the example, the detents 30 are configured as ramps which drop down in the direction towards the support web 25.

In accordance with the embodiment shown in FIG. 8, the blocking element 3 can have an axially projecting region 31 at its end section 26, lying on the exterior. In so far as two detents 30 are provided here, the dimension of this axially projecting region 31 and the distance between the two detents 30 can be coordinated with each other so that in the pre-fitted state the two detents 30 are arranged on both sides of the projecting region 31 and thereby bring about an additional securing of the blocking element 3 in the peripheral direction 16, and namely both in the withdrawal direction 18 and also in the insertion direction 32 indicated by an arrow in FIG. 2.

Figure 4:
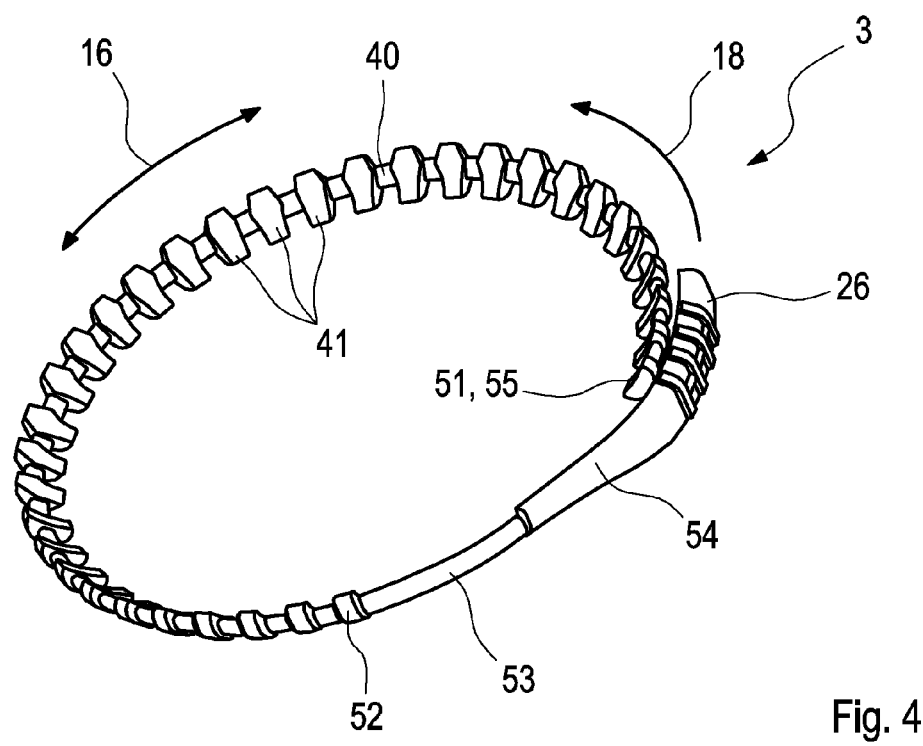

As can be seen for example from FIGS. 4, 8 and 9, the end section 26 of the blocking element 3, lying on the exterior, can be equipped with radial projections 33 or respectively elevations 33, which can be configured for example in the manner of a ribbing. For this, the projections 33 extend in axial direction 22 or in peripheral direction 16. Through these projections 33, the manual gripability of the section 26 is significantly improved. Furthermore, additionally or alternatively to such projections 33, according to FIG. 8 in the end section 26 lying on the exterior, and in particular in the axially protruding region 31, at least one radial slot 34 can be provided. This slot 34, as the slot 28 shown in FIG. 9, can be designed as a tool access, in order for example to be able to move the end section 26 axially out from its securing by means of a flat screwdriver.

In FIG. 2, in addition a cover 35, which can be optionally provided, is indicated by a broken line. This cover 35 is situated on the outside of the housing 2. It can be applied externally onto the pocket 21 or can be formed integrally thereon. In the pre-fitted state, this cover 35 can cover the blocking element 3 radially at least in the region of the housing opening 13. In the example which is shown, the cover 35 also covers the securing device 17 at least partially. Alternatively, it is likewise possible to arrange the cover 35 with respect to the securing device 17 on the opposite side of the housing opening 13 on the housing 2, or respectively to form it integrally thereon. Alternatively, it is likewise possible to design the cover 35 as a separate component with respect to the housing 2. In particular, the cover 35 can then be designed as a clip which is able to be arranged on the housing 2, in particular in the region of the housing opening 13, for example by gripping, elastic clip arms to engage behind the housing opening 13 in radial direction around an edge of the housing opening 13.

As can be seen from the embodiments shown here, the housing opening 13 can be greater in the peripheral direction 16 than in the axial direction 22. In particular, the housing opening 13 at least in the peripheral direction 16 is at least two times greater than in the axial direction 22. Hereby, a bending stress of the blocking element 3 can be reduced on a tangential withdrawal from the housing opening 13. Expediently, the housing opening 13 in the peripheral direction 16 can be equal in size to the end section 26 of the blocking element 3 lying on the exterior in the pre-fitted state. The dimension in the peripheral direction 16 of the housing opening 13 on the one hand and of the end section 26 lying on the exterior, on the other hand, are identical or approximately identical here within the framework of conventional manufacturing tolerances, wherein dimensional variations of +/−10% are able to be tolerated.

In accordance with a preferred embodiment, the housing opening 13 can have a first end 36, which is arranged in the pre-fitted state distally relative to an end 37 of the blocking element 3 lying on the interior. This first end 36 of the housing opening 13 is configured as a radially-running first edge, which leads from the inner groove 6 directly radially to the outer side of the housing 2. In other words, the housing opening 13 is delimited distally to the end 37 of the blocking element 3, lying on the interior, with a radially oriented edge, which is formed by the first end 36. In addition, the housing opening 13 has a second end 38, which in the pre-fitted state is arranged proximally with respect to the end 37 of the blocking element 3 lying on the interior. This second end 38 forms here a radially-running second edge of the housing opening 13, which extends likewise from the inner side of the housing 2 directly radially to the outer side of the housing 2. Therefore, here also the edge of the housing opening 13 proximal to the end 37 lying on the interior, i.e. the second end 38 is oriented radially.

Expediently, the said second edge 38 or respectively the second end 38 of the housing opening 13 can have a transverse web 39 which delimits the inner groove 6 in the peripheral direction towards the housing opening 13. The transverse web 39 thereby forms a stop for the blocking element 3 in the insertion direction 32.

Figure 10:
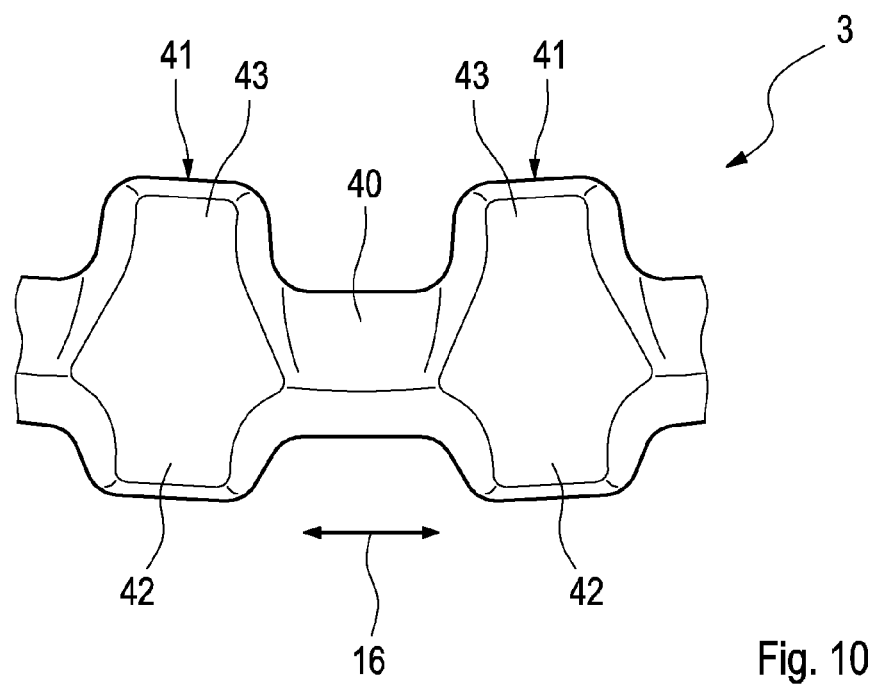
Figure 11:
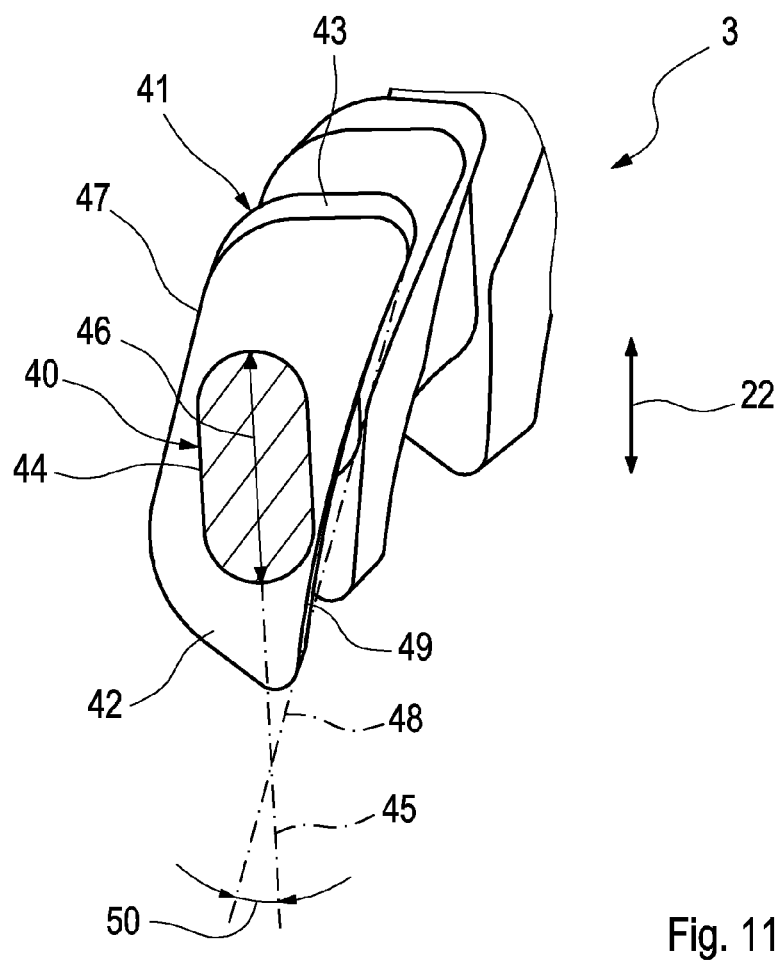

As can be seen in particular from FIGS. 4, 10 and 11, the blocking element 3 in the embodiments shown here has a band-shaped core 40 and several teeth 41, which are arranged adjacent to each other in the peripheral direction 16 and along the core 40. The teeth 41 have here respectively an outer tooth section 42 and an inner tooth section 43. In the inserted state of the insertion section 4, the outer tooth sections 42 interact with the inner groove 5 of the insertion section 4, whilst the inner tooth sections 43 interact with the outer groove 6 of the housing 2. These inner tooth sections 43 and the outer tooth sections 42 protrude from the core 40 at opposite sides. In so doing, they protrude substantially axially from the core 40 in accordance with FIG. 11.

At least between adjacent teeth 41 in accordance with FIG. 1, the core 40 has a core profile 44 in cross-section which has a principal direction 45. The core principal direction 45 is determined or respectively defined here by a maximum diameter 46 of the core profile 44. In contrast to this, the teeth 41 have respectively in cross-section a tooth profile 47 which has a tooth principal direction 48, wherein this tooth principal direction 48 is determined or respectively defined by a tooth flank 49 of the respective tooth 41 lying radially on the interior. The tooth principal direction 48 corresponds here substantially to a straight line, on which the said inner flank 49 comes to lie at least two points or in a defined in a laminar manner.

The blocking element 3 is now produced in accordance with FIG. 11 so that the core principal direction 45 forms an angle 50 with the tooth principal direction 48. In other words, the core principal direction 45 is inclined with respect to the tooth principal direction 48. As can be seen, both the tooth principal direction 48 and also the core principal direction 45 are inclined with respect to the axial direction 22. Preferably, the core principal direction 45 is inclined here in the direction towards the axial direction 22 with respect to the tooth principal direction 48. Preferably, the angle 50 between the core principal direction 45 and the tooth principal direction 48 is selected to be so great that the axial direction 22 lies between the tooth principal direction 48 and the core principal direction 45.

In accordance with FIG. 2, the blocking element 3 has the end section 26, which in the pre-fitted state lies on the outside of the housing 2. The dimensioning of the blocking element 3 is selected to be so great in the peripheral direction 16 that the end section 26, lying on the exterior, in the pre-fitted state overlaps in the peripheral direction 16 an end section 51 of the blocking element, lying on the interior, which has the end 37 lying on the interior, and which lies in the inner groove 6. Hereby, a radial overlapping is produced between the end section 51 lying on the interior and the end section 26 lying on the exterior.

In accordance with FIG. 4, the end section 26 lying on the exterior can have an enlarged profile with respect to the core 40. Hereby, the grip of the end section 26 lying on the exterior is improved, which simplifies the manual actuation of the securing element 3 for withdrawing from the grooves 5, 6.

In accordance with FIGS. 2 and 4, the core 40 can have a toothless core section 53 between the end section 26 lying on the exterior and a first tooth 52, which toothless core section is so great that it extends into the inner groove 6. According to FIG. 2, the entire toothless core section 53 lies inside the inner groove 6.

In accordance with FIGS. 2 and 4, the blocking element 3 can have a twisted transition section 54 between the end section 26 lying on the exterior and the region running in the interior of the housing 2 or respectively in the inner groove 6. This twisted transition section 54 is distinguished in that in this transition section 54 a principal direction of the blocking element profile, not designated in further detail, proceeding from an orientation running parallel to the core principal direction 45, straightens itself in the direction towards the end section 26 lying on the exterior with respect to the axial direction 22, and namely preferably to such an extent that the principal direction of the blocking element profile in the end section 26 lying on the exterior is oriented substantially parallel to the axial direction 22. Hereby, the blocking element 3 can run in an inclined manner with respect to the axial direction 22 in the region of its core 40, whereas in the region of the end section 26 it runs parallel to the axial direction 22. This makes possible a particularly flat and compact type of construction for the connection device 1.

The first tooth 52 in the withdrawal direction 18 can have an introduction bevel, which facilitates the introduction of the blocking element 3 into the housing 2, and/or a withdrawal bevel, which facilitates the withdrawal of the blocking element 3 from the housing 2. Additionally or alternatively, a last tooth 55 in the withdrawal direction 18 can have an introduction bevel facilitating the introduction of the blocking element 3 into the housing 2, and/or a withdrawal bevel facilitating the withdrawal of the blocking element 3 from the housing 2.

As can be seen in particular from FIG. 11, the core 40 can preferably be arranged eccentrically to the teeth 41 with respect to the inner and outer tooth sections 42, 43. In the example of FIG. 11, the core profile 44 is displaced downwards from the centre with respect to the tooth profile 47. This corresponds to a displacement or eccentricity of the core 40 in the direction of the outer tooth sections 42, which interact with the inner groove 6. Hereby, the blocking element 3 can yield elastically more easily into the inner groove 6 on insertion of the insertion section 4.

It is noteworthy here in addition that expediently the dimensions in the peripheral direction 16 of the housing opening 13, of the toothless core section 53, of the twisted transition section 54 and of the end section 26 lying on the exterior are selected to be respectively approximately equal in size.

In addition, it can be seen from FIG. 10 that adjacent teeth 41 in the peripheral direction 16 have a comparatively great distance from each other. The said distance corresponds approximately to a tooth width measured in the peripheral direction. Hereby, a particularly high degree of flexibility and stability are produced for the blocking element 3.

It can be seen from FIGS. 5 and 6 that the blocking element 3, in particular with regard to its inner tooth sections 43, is preferably shaped so that several differently shaped outer grooves 5 can be secured in a sufficiently form-fitting manner. Thus, FIGS. 5 and 6 show two different embodiments for the insertion sections 4 or respectively for the outer grooves 5 formed thereon. FIG. 5 shows in addition an alternative seal 14'.

Expediently, the blocking element 3 can be injection-moulded from plastic, wherein this injection moulded part comprises both the core 40 and also the teeth 41. Basically, the blocking element 3 can be produced here from a homogeneous plastic, so that the core 40 and the teeth 41 have no material differences. Furthermore, it is, however, also possible to produce the blocking element 3 from plastic, so that it can be fibre-reinforced at least in the region of the core 40, wherein the respective reinforcing fibres, such as e.g. glass fibres or carbon fibres, preferably extend in the peripheral direction. Alternatively, an embodiment is also conceivable in which the blocking element 3 is produced in that the teeth 41 are injected onto the core 40. Whilst the teeth 41 preferably consist of plastic, the core 40 can then basically likewise be produced from plastic, preferably from a different plastic than the teeth 41, or from a different material. The same then also applies for the end section 26 lying on the exterior, which can likewise be injected onto the core 40 or can be formed integrally thereon.

As soon as the insertion section 4 is inserted into the connection device 1, the housing 2 and the insertion section 4 are connected with each other fluidically. Hereby in addition a connection arrangement 56 is produced, which comprises the connection device 1 and the insertion section 4 inserted therein.

Figure 12:
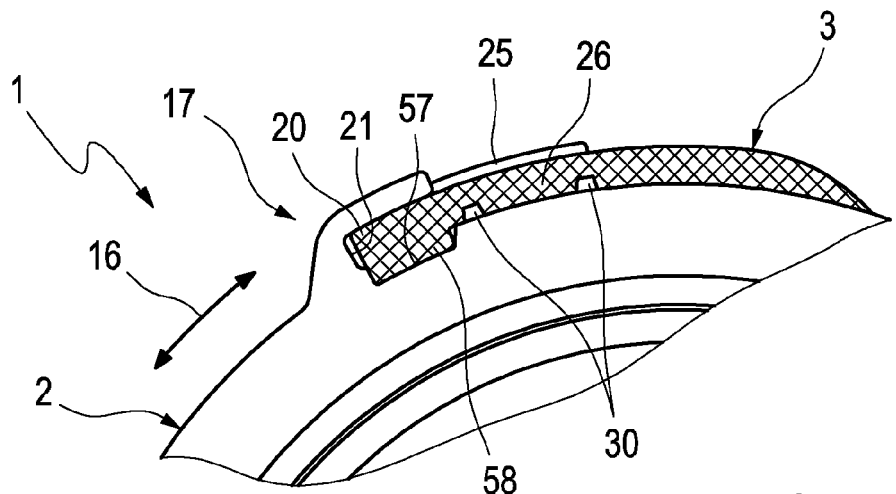

According to FIG. 12, in accordance with another embodiment of the securing device 17, a depression 57 can be provided on the outside of the housing 2. This depression 57 is arranged here on the housing 2 so that a projection 58, which protrudes inwards on the end 20 of the blocking element 3 lying on the exterior, engages into this depression 57. Hereby, an additional fixing is produced of the blocking element 3 in the peripheral direction 16. Furthermore, the projection 58 makes possible a simplified manual withdrawal of the blocking element 3 for releasing the connection of the connection device 1.

In the example which is shown, the depression 57 is situated inside the mounting pocket 21, so that it is radially overlapped.

Figure 13:
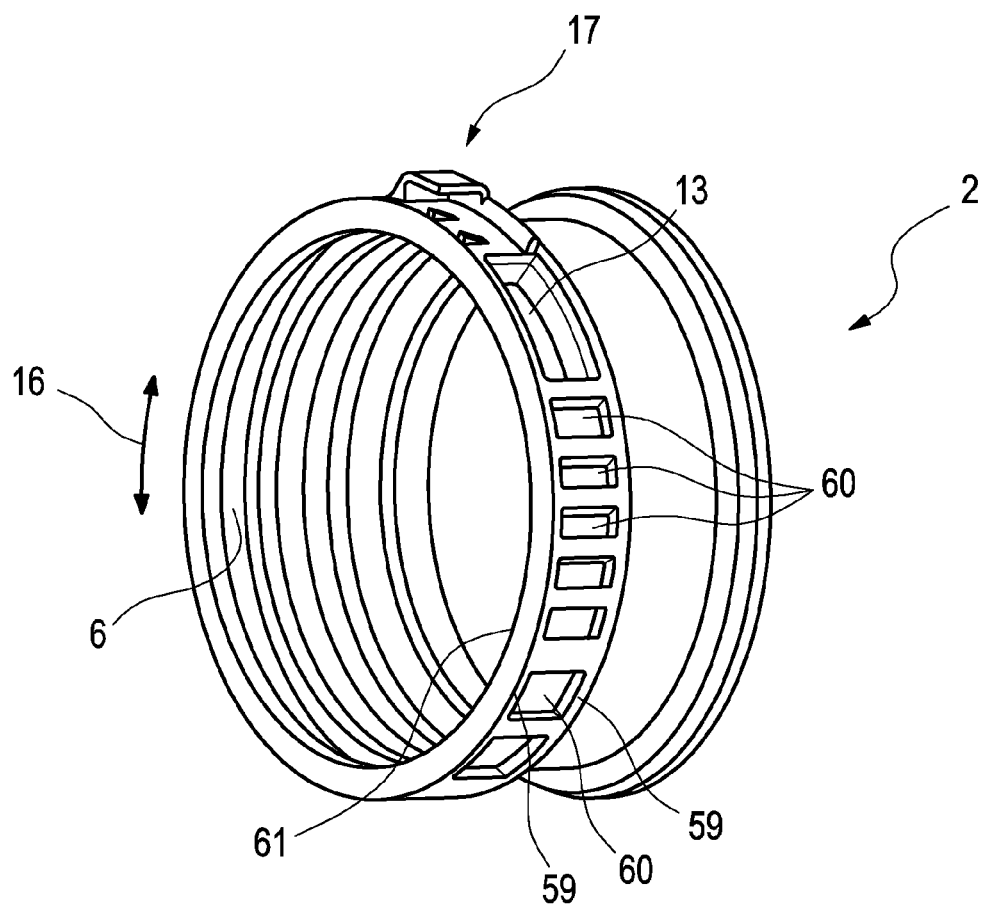
Figure 14:
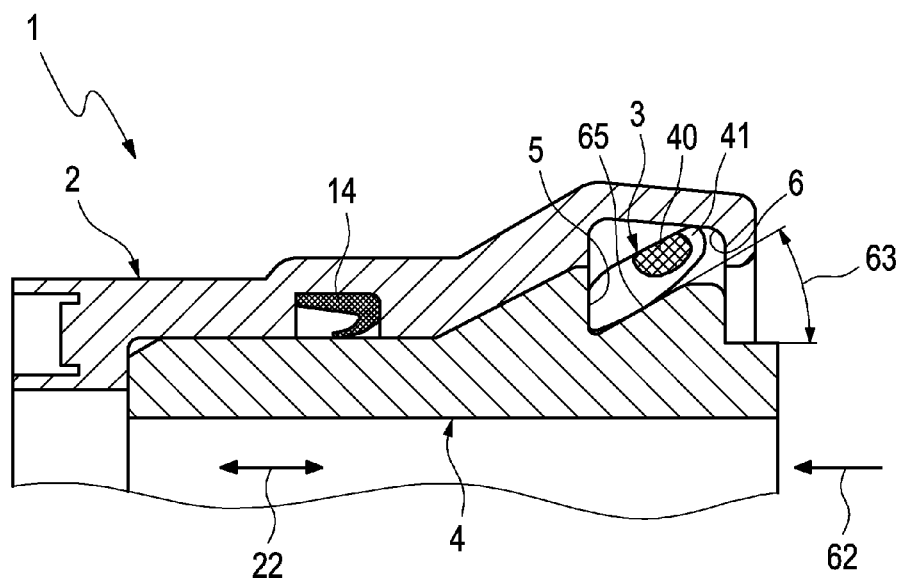

In accordance with FIG. 13, the housing 2 can be reinforced by means of at least one peripheral rib 59. The respective peripheral rib 59 extends here in the peripheral direction 16, expediently closed in an annular shape. The respective peripheral rib 59 is arranged here on the outside of the housing 2. In the example, two such peripheral ribs 59 are provided, which are arranged spaced apart from each other axially. Furthermore, in the example also several longitudinal ribs 60 are provided, which are likewise arranged on the outside of the housing 2 and extend here in the longitudinal direction of the housing 2. Expediently, the longitudinal ribs 60 are dimensioned here so that they connect the two peripheral ribs 59 with each other. The one peripheral rib 59, facing the observer in FIG. 13, is arranged at the free end of the housing 2, which has an insertion opening 61 for insertion of the insertion section 4. In addition, the two peripheral ribs 59 are positioned on the housing 2 here preferably so that they are situated axially on both sides of the inner groove 6, so that the inner groove 6 is positioned axially between the two peripheral ribs 59. Hereby, the housing 2 is reinforced in the region of the inner groove 6.

In accordance with FIGS. 14 to 17, the outer groove 5 of the insertion section 4 can have a ramp profile 65 transversely to the peripheral direction 16, i.e. in the axial direction 22 or longitudinal section 22. The ramp profile 65 is oriented here so that it slopes down in an insertion direction 62 of the insertion section 4, indicated by an arrow. The insertion direction 62 defines here the relative movement of the insertion section 4 relative to the housing 2 on insertion of the insertion section 4 into the housing 2.

Through the ramp shape of the outer groove 5, the risk is to be reduced that the teeth 41 of the blocking element 3 straighten themselves too much in the case of a tractive force between the insertion section 4 and the housing 2, which would lead to high radial forces. The ramp profile 65 causes the teeth 41 to largely remain and be supported in a predetermined alignment. For example, the ramp profile 65 has a ramp angle 63 which is at a maximum 45°.

Figure 15:
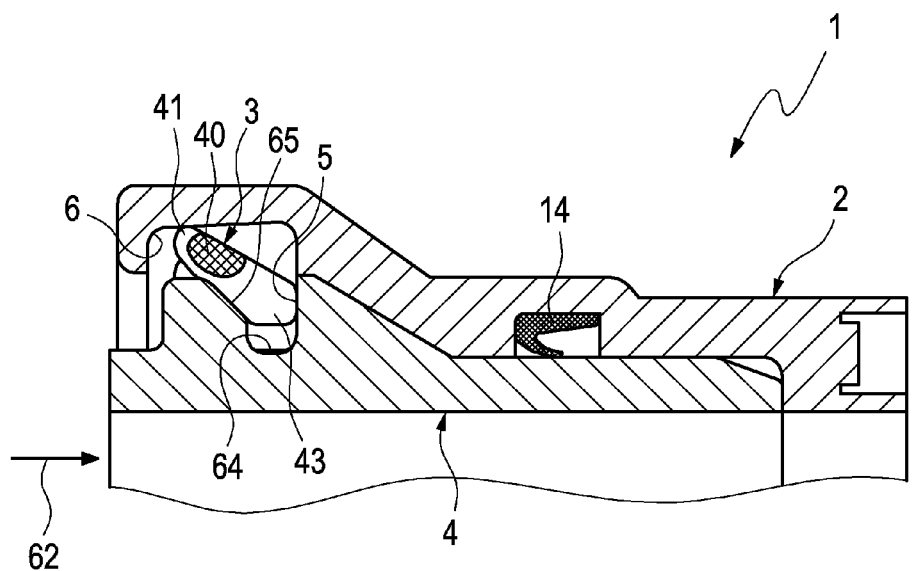

In the embodiment shown in FIG. 15, the outer groove 5 is shaped geometrically so that it has a depression 64 on an end of the ramp profile 65 lying on the interior. This depression 64 is dimensioned here expediently so that the teeth 41 of the blocking element 3 are arranged in the depression 64 or respectively in the region of the depression 64 standing freely radially. This means that the inner tooth sections 43 of the teeth 41 can project partially into the depression 64, but are spaced apart radially with respect to the base of the depression 64 lying radially on the interior. This structural form has the consequence that the teeth 41 can rest radially only on the ramp profile 65, so that the straightening tendency of the teeth 41 is additionally reduced.

Figure 16:
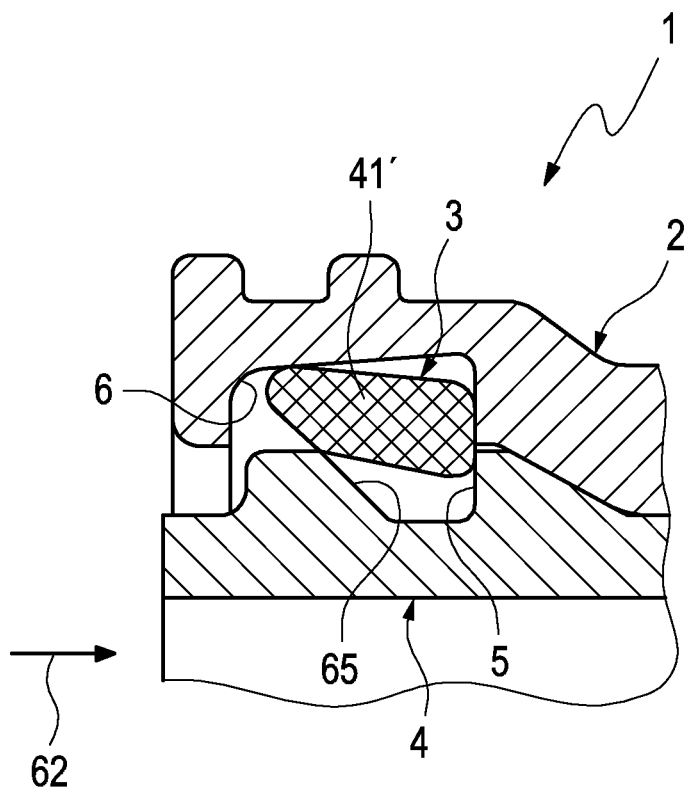
Figure 17:
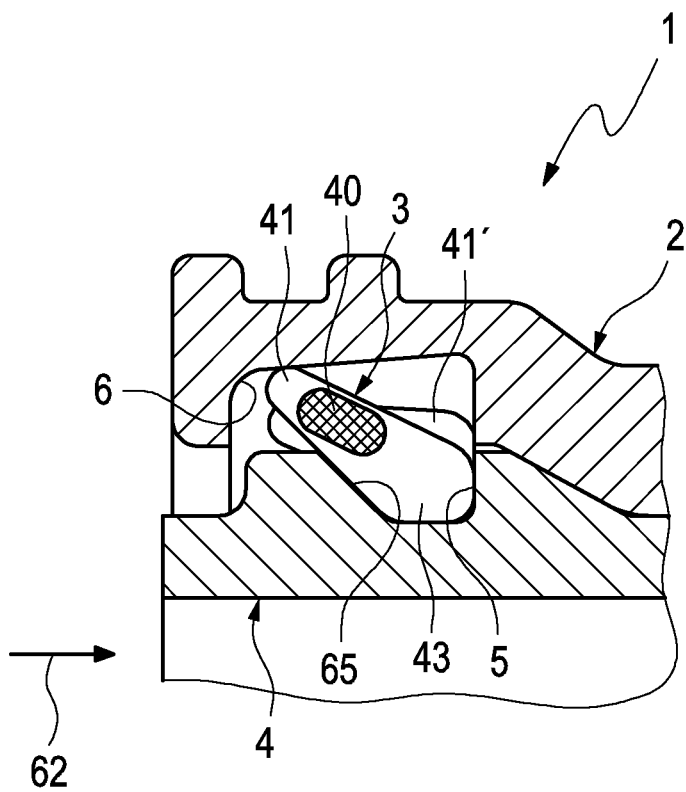

In accordance with FIGS. 16 and 17, according to a particularly advantageous embodiment, at least one "special" tooth 41' can be different with respect to the other "normal" teeth 41 as regards its geometry and/or as regards its alignment with respect to the core 40, i.e. can have a different angle between the tooth principal direction 48 and the core principal direction 45. In the example which is shown of FIGS. 16 and 17, the said special tooth 41' is different with respect to the other normal teeth 41 both as regards its geometry and also as regards its alignment. Expediently, several such special teeth 41' can be provided along the blocking element 3, but in total fewer than half of all the teeth 41, 41'. For example, only 10% or a maximum of 10% of the teeth 41, 41' are configured or respectively arranged differently from the remaining normal teeth 41. These different, special teeth 41' are expediently arranged distributed in the peripheral direction preferably spaced apart from each other uniformly along the blocking element 3.

As can be seen from FIGS. 16 and 17, the respective special tooth 41' is configured or respectively arranged so that in the pre-fitted state and in particular also in the inserted state in the insertion direction 62 in the inner groove 6 it rests axially on the housing 2. Hereby, on insertion, it is prevented that the blocking element 3 moves axially relative to the housing 2, such that the other normal teeth 41 protrude with their inner tooth sections 43 axially over the inner groove 6 and thereby can jam between the housing 2 and the insertion section 4. In particular, it can be seen readily from FIG. 17 that in the pre-fitted state or respectively in the inserted state, the normal teeth 41 rest with their inner tooth section 43 exclusively in the outer groove 5 on the insertion section 4, whereas the special teeth 41' rest axially in the inner groove 6 on the housing 2 and in the example in addition in the outer groove 5 on the insertion section 4.

The invention claimed is:

1. A connection device, comprising:
an insertion section having an annular outer groove,
a housing configured to receive the insertion section;
a blocking element configured to lock the insertion section in the housing,
  wherein the blocking element for locking the insertion section in the housing engages into the annular outer groove and into an annular inner groove formed in the housing,
  wherein the blocking element is configured to be withdrawn in a withdrawal direction through a housing opening substantially tangentially to the grooves,
  wherein the blocking element is configured to be pre-fitted in the inner groove and in a pre-fitted state, the insertion section is configured to be inserted into the housing with elastic deformation of the blocking element from the pre-fitted state, and
  wherein the blocking element in the pre-fitted state engages the outer groove and is fixed on the housing securing the blocking element against a displacement in a peripheral direction, and
a securing device arranged on an exterior of the housing for securing of the blocking element against displacement at least in the withdrawal direction,
wherein the securing device has an outer stop arranged on the exterior of the housing lying opposite an end of the blocking element, the end of the blocking element arranged on the exterior of the housing in the pre-fitted state.

2. The connection device according to claim 1, wherein the outer stop is constructed in a mounting pocket.

3. The connection device according to claim 1, wherein the securing device has a detent device having at least one detent configured to interact with an end section of the blocking element arranged on the exterior of the housing, such that the at least one detent impedes an axial adjustment of the end section relative to the housing.

4. The connection device according to claim 3, wherein the blocking element has an axially protruding region on its end section, wherein the detent device includes two detents arranged in the peripheral direction on both sides of a protruding region of the blocking element in the pre-fitted state.

5. The connection device according to claim 1, further comprising an end section of the blocking element lying on the exterior of the housing, the end section having at least one of a radial slot extending in the peripheral direction and at least one radial projection extending in at least one of the peripheral direction and in the axial direction.

6. The connection device according to claim 1, further comprising a cover arranged on the exterior of the housing configured to cover the blocking element radially at least in the region of the housing opening in the pre-fitted state, wherein the cover at least partially covers the securing device, and
wherein the width of the housing opening is at least two times greater in the peripheral direction than in the axial direction, and
wherein the width of the housing opening in the peripheral direction is approximately equal in size to an end section of the blocking element lying on the exterior of the housing in the pre-fitted state.

7. The connection device according to claim 1,
wherein the housing opening has a first end arranged distally to an end of the blocking element lying on the interior of the housing in the pre-fitted state, the first end having a radial first edge, which leads from the inner groove directly radially to the exterior of the housing, wherein the housing opening has a second end arranged proximally to the end of the blocking element lying on the interior of the housing in the pre-fitted state, the second end having a radial second edge, which leads from an inner side of the housing directly radially to the exterior of the housing; and
wherein at least one of the second edge and the second end has an axially extending transverse web delimiting the inner groove in the peripheral direction towards the housing opening.

8. The connection device according to claim 1,
wherein the securing device defines a depression on the exterior of the housing, the depression configured to receive a projection protruding inwards from an end of the blocking element lying on the exterior of the housing.

9. The connection device according to claim 1,
wherein the exterior of the housing has at least one peripheral rib extending in peripheral direction, and
the at least one peripheral rib being arranged at an end of the housing having an insertion opening for receiving the insertion section.

10. The connection device according to claim 1, wherein the securing device has a mounting pocket arranged on the exterior of the housing configured to receive an end of the blocking element-arranged on the exterior of the housing in the pre-fitted state.

11. The connection device according to claim 10, wherein the outer stop is constructed in the mounting pocket.

12. The connection device according to claim 11, wherein the mounting pocket is open on an axial side and is configured to receive the end of the blocking element arranged on the exterior of the housing through the open axial side, and wherein the end is removable from the axial side of the mounting pocket.

13. A connection device, comprising:
an insertion section having an annular outer groove,
a housing configured to receive the insertion section;
a blocking element configured to lock the insertion section in the housing,
  wherein the blocking element for locking the insertion section in the housing engages into the annular outer groove and into an annular inner groove formed in the housing,
  wherein the blocking element is configured to be withdrawn in a withdrawal direction through a housing opening substantially tangentially to the grooves,
  wherein the blocking element is configured to be pre-fitted in the inner groove and in a pre-fitted state, the insertion section is configured to be inserted into the housing with elastic deformation of the blocking element from the pre-fitted state, and wherein the blocking element in the pre-fitted state engages the outer groove and is fixed on the housing securing the blocking element against a displacement in a peripheral direction, and
a securing device arranged on an exterior of the housing for securing of the blocking element against displacement at least in the withdrawal direction,
wherein the securing device has a mounting pocket arranged on the exterior of the housing configured to receive an end of the blocking element arranged on the exterior of the housing in the pre-fitted state.

14. The connection device according to claim 13, wherein the mounting pocket is open on an axial side and is configured to receive the end of the blocking element arranged on the exterior of the housing through the open axial side, and wherein the end is removable from the axial side of the mounting pocket.

15. The connection device according to claim 13, wherein the mounting pocket is closed on an axial side and is lengthened in the direction towards the housing opening by a support web, wherein an end section of the blocking element is arranged on the exterior of the housing in the pre-fitted state.

16. The connection device according to claim 15, wherein the blocking element defines an indentation formed on the end section forming a slot between the end section and the support web for tool access.

17. A connection device, comprising:
an insertion section having an annular outer groove,
a housing configured to receive the insertion section;
a blocking element configured to lock the insertion section in the housing,
wherein the blocking element for locking the insertion section in the housing engages into the annular outer groove and into an annular inner groove formed in the housing,
wherein the blocking element is configured to be withdrawn in a withdrawal direction through a housing opening substantially tangentially to the grooves,
wherein the blocking element is configured to be pre-fitted in the inner groove and in a pre-fitted state, the insertion section is configured to be inserted into the housing with elastic deformation of the blocking element from the pre-fitted state, and
wherein the blocking element in the pre-fitted state engages the outer groove and is fixed on the housing securing the blocking element against a displacement in a peripheral direction, and
a securing device arranged on an exterior of the housing for securing of the blocking element against displacement at least in the withdrawal direction,
wherein the exterior of the housing has at least two peripheral ribs spaced apart from each other axially, the inner groove being arranged axially between two such peripheral ribs.

18. The connection device according to claim 17, wherein the exterior of the housing has a plurality of longitudinal ribs extending in longitudinal direction connecting the at least two peripheral ribs with each other.

* * * * *